Patented Mar. 5, 1940

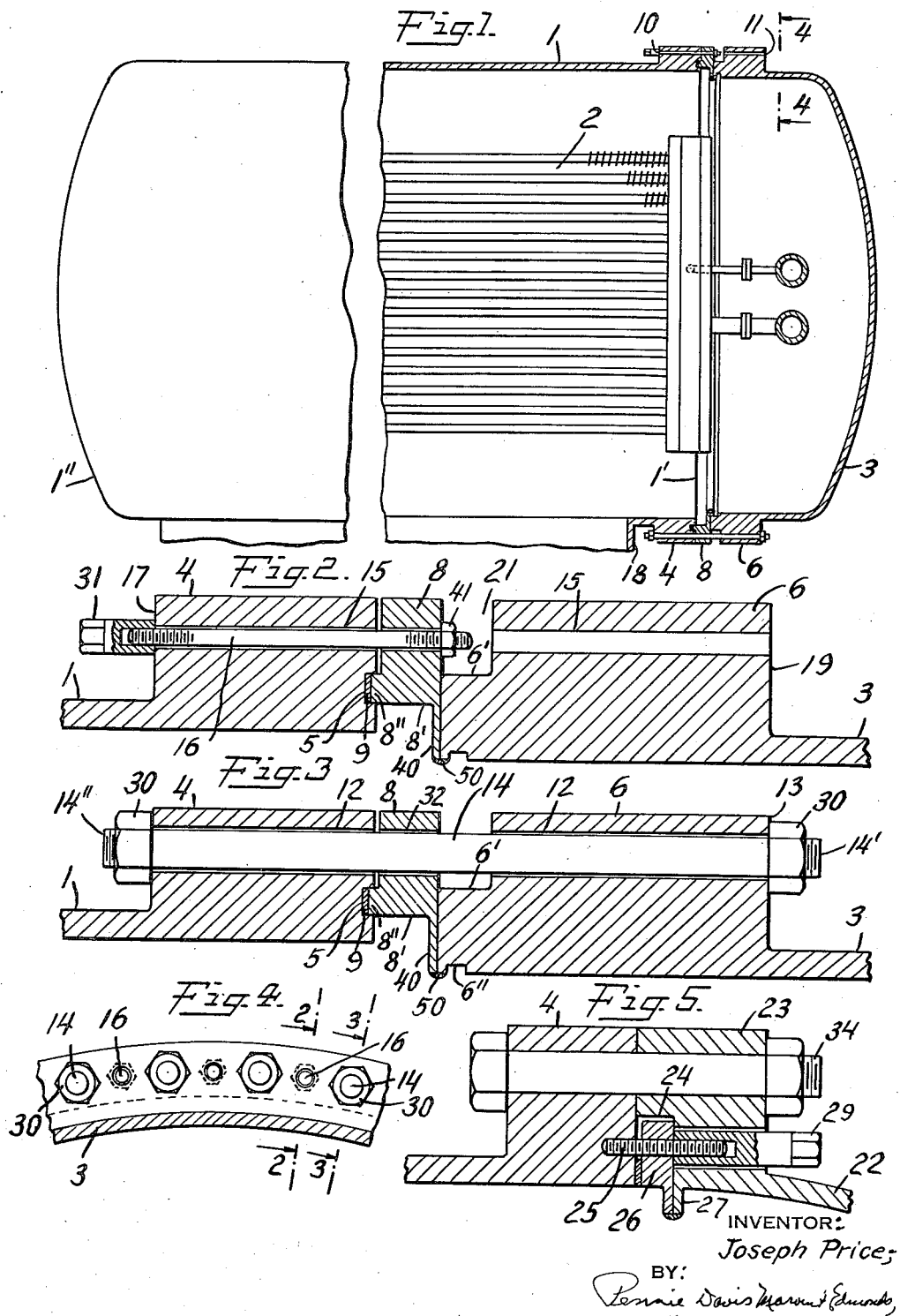

2,192,328

UNITED STATES PATENT OFFICE 2,192,328

CLOSURE FOR HEAT EXCHANGERS

Joseph Price, West New Brighton, Staten Island, N. Y., assignor to The Griscom-Russell Company, New York, N. Y., a corporation of Delaware Application June 26, 1936, Serial No. 87,377

11 Claims. (Cl. 220—3)

This invention relates to the structure of heat exchange apparatus and particularly to the construction of the joints thereof.

In ordinary heat exchangers, direct-bolted, flanged joints are employed, as between the shell and the cover. In the case of evaporators and other apparatus having large diameters and working with high pressure, the hydraulic load on the joints may become so high that even if the joint-bolts have been heavily sledged into place in assembling, when pressure gets up in the shell the bolts will be so stretched as to cause the flanges to come away from the gaskets, thus resulting in leaks of such a nature that it is desirable, usually, to promptly remedy the situation by strenuously going over each of the many bolts during operation. Even after being thus rendered fluid-tight again, when the ordinary joint is subjected to the thermal strains of the usual daily scale-cracking operations, involving alternate heating and cooling and producing considerable differences in the length of the parts of the shell and of the joints, the joint will open up again and cause the apparatus to leak as before.

It is an object of this invention to provide a heat-exchanger which will not leak at the joints, so that it will not be necessary to "go over" the bolts again, either during operation or when it is cold, once these bolts have been tightened into place in the initial assembling of the apparatus.

A particular object of the invention is to provide a bolted-flange and gasket joint in which the flange will not relieve the gasket of the necessary sealing pressure and which will not open up either under the hydraulic thrust, etc., under thermal strains, or even under warping of the shell.

A further particular object of the invention is to provide a heat-exchanger joint of this improved nature which, notwithstanding, will not be complex, delicate, or expensive, or necessitate additional gaskets, but instead will be essentially simpler, cheaper and more rugged than other joints for preventing leakage.

The other objects and advantages of the invention will be made manifest as this specification proceeds.

The presently preferred embodiment of these concepts is shown, by way of example, in the accompanying drawing, but the invention is limited in its embodiments only by the scope of the sub-joined claims.

In the drawing,

Fig. 1 is a fragmentary longitudinal section, partly in elevation, of an evaporator embodying the present improvements;

Fig. 2 is a sectional detail thereof on line 2—2 of Fig. 4;

Fig. 3 is a similar view on line 3—3 of Fig. 4;

Fig. 4 is a detail on line 4—4 of Fig. 1, and

Fig. 5 is a sectional detail of a modification.

The invention is illustrated in Fig. 1 as applied to an evaporator, there shown as of the horizontal type and including a shell or housing 1. The shell is shown as open at one end 1' and the other end, 1", is closed, the closure being formed integrally with the shell. A heating-element, or tube-bundle, 2, is mounted in the shell, and a cover or door 3 is provided for the open end 1' of the shell. Conventional means (not shown) are provided for de-scaling the heating element, and include, as usual, a steam-inlet valve for the heating element, and a water-inlet valve and vapor-outlet valve and blow-down valves for the shell.

The open end, 1', of the shell is provided with an annular, thick flange 4, lying substantially at right angles to the shell and being provided with an annular groove 5, of a depth and width, etc., dependent on circumstances later to be pointed out. The cover, or door, 3, is also provided with a bolting-flange 6, which departs considerably from the conventional cover-flange. Instead of consisting of but a right-angled turn from the cover side, it in addition includes an annular projection 6' having a kerf, or interior-facing groove, 6". To this annular projection 6' near the kerf 6" of the flange 6, is attached a ring or annulus, 8, of somewhat larger internal diameter than the cover except for a thin inwardly projecting flange, lip, or fin 40, located on the side adjacent the cover flange. The ring 8 is attached to the cover flange by welding the adjacent, aligned, internal peripheral faces of the fin 40 and of the flange formed by the kerf 6". The welding employs such material and is so made as to not result in a mere devitalized ribbon of metal, added at this region by the weld, the band 50 instead consisting of fully springy, vital metal capable of indefinitely withstanding the repeated bendings, stretchings, etc. to which it will be subjected, without in the slightest fracturing, or "coming unstuck" or otherwise becoming inoperative or leaking.

The ring 8 has a considerable annular projection 8" on its side adjacent the flange 4 of the shell, which projection 8" is adapted to fit snugly into the groove 5, and even to make a fluid-tight joint therewith, metal-to-metal, if desired. Preferably, however, a gasket 9 of suitable shape, composition, etc., is employed and seated in the bottom of groove 5, and the member 8" is brought to bear fluid-tightly against the gasket in initially assembling the apparatus. By virtue of means hereinafter described, this gasket is held permanently in fluid-tight contact with it regardless of conditions, yet without requiring any further adjustment of any of the bolts after the apparatus is once assembled.

The flanges 4 and 6 are provided with bolt holes, alternating in size, one series, 12, being larger than the other 15, both sizes lying in pitch circles of the same diameter. The series of larger diameter bolt-holes 12, is adapted to receive large through-bolts 14. These bolts are double-ended, or stud-bolts, and are provided with screw-threads 14' and 14'' at either end and suitable hexagonal nuts 30 therefor.

The bolts, nuts and flanges just described are intended merely to hold the shell and cover together in a reasonable juxtaposition, and to resist only the hydraulic pressure or thrust in the shell, and which, in apparatus of this large diameter and high working-pressure, may be quite high. Since they exert no excess, or back, pressure on the gasket, as to compress it, and bear no gasket-compressing load, they are not required to have the usual excessive size and unusual tensile-strength that is ordinarily necessary in order to exert back-pressure on a gasket, and instead are made smaller than hitherto deemed practicable for flanged joints. The bolts 14 pass through the ring 8 in holes 32 of excess diameter providing an appreciable clearance.

Between each pair of bolt-holes 12 and through bolts 14, is located a smaller bolt-hole 15, extending through each of the flanges 4 and 6 and through the member 8. These holes are preferably made about one-half the diameter of the others, and are adapted to receive in them, special bolts 16. While usually they are inserted through the end 17 of their bolt-holes, just as bolts 14 are usually inserted through end 13, yet situations may occur wherein obstructions lying on the shell close to end 17, as shown at 18, in Fig. 1, may prevent insertion from this direction, whereupon they can readily be inserted into the holes 15, from the other end, marked 19, as in Fig. 2. In either event, they are provided at one end with cap nuts 31, and at the other end with ordinary nuts 41, inserted in kerf 21 and set up onto the member 8 until the projection 8'' forces the gasket into a fluid-tight joint with the flange 4, and this pressure is maintained regardless of all normal influences tending to relax it.

In Fig. 5 the principle disclosed in Figs. 1, 2, and 3 is embodied in a modified structure. The cover or door 22 is, in this instance, provided with a flange 23 that has a kerf 24 which faces on its interior periphery, instead of on its exterior, as with kerf 21. The cover flange and the shell flange 4, also, directly abut each other. The two sets of bolts—the through bolts and the gasket bolts—are not arranged on a common pitch-circle; instead, the through bolts 34 that take all the thrust or hydraulic strains are arranged on a circle lying exteriorly of the circle containing the gasket-holding bolts 25. The expansion-member 26 is not attached to the edge of the bolting-flange but to the edge of a distinct flange 27 projecting inwardly from the inner periphery of the cover 22. The expansion member, in this modification, bears no projection like part 8'' of the preceding form, the gasket instead being satisfactorily seated directly against flange 4 in the kerf 24 between flange 23 and flange 4. It is held securely in place by the flat face of the expansion member 26. An elongated cap nut 29 is provided on each stud-bolt 25, both to protect the threads from any "bruising" that would prevent backing-off the nut, and also to enable the ends of these short bolts to be readily reached down in their deep sockets in assembling the nuts on the studs. In dis-assembling, the studs are not removed, only the nuts being taken out. The expansion joint being located in one flange, long bolts like 14 are obviated. By making the flanges thick enough, slotted holes may be employed.

In both the examples illustrated, the through bolts take almost the entire hydraulic thrust of the liquid in the shell, yet do not need, when starting up the apparatus, to be sledged or otherwise arduously worked into place, but can well be only wrenched ordinarily tight. Under the working-pressure inside the evaporator, they may indeed elongate somewhat, temporarily, but even so, it will not be necessary to "go-over" the nuts, as in the usual evaporator, for these cover-holding bolts do not exert the principal gasket-sealing pressure and take chiefly the cover-induced strains of the apparatus. In contradistinction to these bolts, the gasket bolts take none, or little, of the hydraulic thrust, and instead exert chiefly a gasket-sealing compressive force. Due to the structure of the expansion flange, any movement of the cover 3 away from the shell 1 due to the stretching of the bolts 14 under the hydraulic pressure, or to the contraction and other thermal strains which occur during the scale cracking operation, will be absorbed by a separation-action taking place between the ring 8 and flange 6 without loosening the gasket joint.

The improved joint completely eliminates the chief cause of leakage in heat exchangers, and, among other advantages, it also gives rise to the improvement that smaller and cheaper gaskets may be employed so that the upkeep in both labor and material is considerably reduced. The cost of making or running heat exchangers embodying the present invention need not be appreciably above unimproved heat exchange apparatus; in fact, in the long run, the cost of apparatus embodying the present invention will, other things being equal, usually be found to be less than that of the ordinary large, high-pressure evaporator, and they are well adapted for handling scale-forming fluids, as scale deposits afford no chance of rendering the door or joint inoperative.

It will of course be understood that showing the joint in an evaporator of this particular type, or in an evaporator at all, is by way of example only, and that the joint may be employed with advantage in other types of evaporators or in other types of heat-exchange apparatus, and that the specific form, and other structure of the joint is contemplated as being capable of being variously modified without thereby in any wise departing from the scope of this invention and of the subjoined claims.

I claim:

1. Heat exchanger apparatus comprising a member having an opening therein, a flange around said opening, closure means for said opening comprising a cover having a flange element, a sealing ring element permanently secured to said cover, means for clamping the cover flange to said opening flange, and means independent of the aforesaid clamping means for clamping said ring to said opening flange to provide a fluid-tight joint therebetween, at least one of said elements having a flexible portion permitting displacement of said closure means with respect to a portion of said ring element.

2. Heat exchanger apparatus comprising a member having an opening therein, a flange around said opening, closure means for said opening comprising a cover having a flange, a sealing ring carried by said cover, means for clamping the cover flange to said opening flange, and means independent of the aforesaid clamping means for clamping said ring to said opening flange to provide a fluid-tight joint therebetween, said ring having a flexible portion, and means for permanently securing said flexible portion to said closure means to form a permanent seal between the ring and the closure means.

3. Heat exchanger apparatus comprising a member having an opening therein, a flange around said opening, closure means for said opening comprising a cover having a flange element, a sealing ring element permanently secured to said cover, a series of bolts for clamping the cover flange to said opening flange, and a second series of bolts for clamping said ring to said opening flange to provide a fluid-tight joint therebetween, at least one of said elements having a flexible portion permitting displacement of said closure means with respect to a portion of said ring element.

4. Heat exchanger apparatus comprising a member having an opening therein, a flange around said opening, closure means for said opening comprising a cover having a flange and an inwardly projecting fin, a sealing ring having an inwardly projecting fin, means for permanently uniting said fins at their inner edges, means for clamping the cover flange to said opening flange, and means independent of the aforesaid clamping means for clamping said ring to said opening flange to provide a fluid-tight joint therebetween.

5. Heat exchanger apparatus comprising a member having an opening therein, a flange around said opening, closure means for said opening comprising a cover having a flange element, a sealing ring element permanently secured to said cover, means for clamping the cover flange to said opening flange, and means independent of the aforesaid clamping means for clamping said ring to said opening flange to provide a fluid-tight joint therebetween, said cover flange being clamped directly against said opening flange, and at least one of said elements having a flexible portion permitting displacement of said closure means with respect to a portion of said ring element.

6. Heat exchanger apparatus comprising a member having an opening therein, a flange around said opening, closure means for said opening comprising a cover having a flange element, a sealing ring element permanently secured to said cover, means for clamping the cover flange to said opening flange, and means independent of the aforesaid clamping means for clamping said ring to said opening flange to provide a fluid-tight joint therebetween, said cover flange being clamped indirectly against said opening flange through the said sealing ring, and at least one of said elements having a flexible portion permitting displacement of said closure means with respect to a portion of said ring element.

7. Heat exchanger apparatus comprising a member having an opening therein, a cover element for said opening, an open ring expansion member element interposed between the periphery of the opening and the cover element, means for securing the cover element over the opening, sealing means, independent of said securing means, for forming a fluid-tight seal between the periphery of the opening and the expansion member element, and additional sealing means for forming a fluid-tight seal between said expansion element and said cover element, at least one of said elements having a flexible portion permitting displacement of said cover element with respect to a portion of said expansion element.

8. Heat exchanger apparatus comprising a member having an opening therein, a cover element for said opening, an expansion member element interposed between the periphery of the opening and the cover element, means for securing the cover element over the opening, sealing means, independent of said securing means, for forming a fluid-tight seal between the periphery of the opening and the expansion element, and additional sealing means for forming a fluid-tight seal between said expansion element and said cover element, one of said sealing means forming a permanent connection between the parts sealed thereby, and at least one of said elements having a flexible portion permitting displacement of said cover element with respect to a portion of said expansion element.

9. Heat exchanger apparatus comprising a member having an opening therein, closure means for said opening comprising a cover having a flange and an inwardly projecting fin, a sealing ring having an inwardly projecting fin, means for permanently uniting said fins at their inner edges, means for clamping the cover flange over said opening, and means independent of the aforesaid clamping means for providing a fluid-tight joint between said ring and said body, the said ring being normally supported on one side by said cover.

10. Heat exchanger apparatus comprising a member having an opening therein, a cover element for said opening, an open ring expansion element interposed between the periphery of the opening and the cover element, and normally supported on one side by said cover element, means for securing the cover element over the opening, sealing means independent of said securing means, for forming a fluid-tight seal between the periphery of the opening and the expansion element, and additional sealing means for forming a fluid-tight seal between said expansion element and said cover element, at least one of said elements having a flexible portion permitting displacement of said cover element with respect to a portion of said expansion element.

11. Heat exchanger apparatus comprising a member having an opening therein, a cover element for said opening, an expansion element interposed between the periphery of the opening and the cover element and normally supported on one side by said cover element, means for securing the cover element over the opening, sealing means independent of said securing means, for forming a fluid-tight seal between the periphery of the opening and the expansion element, and additional sealing means for forming a fluid-tight seal between said expansion element and said cover element, one of said sealing means forming a permanent connection between the parts sealed thereby and at least one of said elements having a flexible portion permitting displacement of said cover element with respect to a portion of said expansion element.

JOSEPH PRICE.

CERTIFICATE OF CORRECTION.

Patent No. 2,192,328. March 5, 1940.

JOSEPH PRICE.

It is hereby certified that error appears in the printed specification of the above numbered patent requiring correction as follows: Page 3, first column, line 67, and second column, line 1, claim 7, and line 9, claim 8, strike out the word "member"; and that the said Letters Patent should be read with this correction therein that the same may conform to the record of the case in the Patent Office.

Signed and sealed this 16th day of April, A. D. 1940.

(Seal)

Leslie Frazer
Acting Commissioner of Patents.